(12) United States Patent
Takeno et al.

(10) Patent No.: US 8,470,056 B2
(45) Date of Patent: Jun. 25, 2013

(54) NON-AQUEOUS ELECTROLYTE SECONDARY BATTERY AND METHOD FOR PRODUCING THE SAME

(75) Inventors: Mitsuhiro Takeno, Osaka (JP); Hideki Sano, Osaka (JP); Akira Iguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 822 days.

(21) Appl. No.: 12/307,644

(22) PCT Filed: Jan. 23, 2008

(86) PCT No.: PCT/JP2008/050876
§ 371 (c)(1),
(2), (4) Date: Jan. 6, 2009

(87) PCT Pub. No.: WO2008/090915
PCT Pub. Date: Jul. 31, 2008

(65) Prior Publication Data
US 2009/0288289 A1    Nov. 26, 2009

(30) Foreign Application Priority Data
Jan. 24, 2007    (JP) .................................. 2007-013323

(51) Int. Cl.
H01M 4/04    (2006.01)
(52) U.S. Cl.
USPC ............. 29/623.1; 429/209; 205/57; 205/687

(58) Field of Classification Search
USPC . 429/188–207; 205/50, 57–66, 687; 29/623.1
See application file for complete search history.

(56) References Cited

U.S. PATENT DOCUMENTS

| 6,274,275 B1 * | 8/2001 | Yamawaki et al. ........... 429/235 |
| 2003/0157407 A1 | 8/2003 | Kosuzu et al. |
| 2003/0186125 A1 * | 10/2003 | Shimakawa et al. .......... 429/223 |
| 2007/0054192 A1 * | 3/2007 | Koga et al. ............... 429/231.95 |

FOREIGN PATENT DOCUMENTS

| JP | 2002-358952 | 12/2002 |
| JP | 2004-185810 | 7/2004 |
| JP | 2005-183142 | 7/2005 |
| JP | 2006-221832 | 8/2006 |

* cited by examiner

*Primary Examiner* — Milton I Cano
*Assistant Examiner* — Stephen Yanchuk
(74) *Attorney, Agent, or Firm* — McDermott Will & Emery LLP

(57) ABSTRACT

The method for producing a non-aqueous electrolyte secondary battery of the invention includes: (a) a step of preparing an electrode mixture slurry, (b) an ionization step of oxidizing and ionizing a metal impurity present in the electrode mixture slurry, and (c) a step of producing an electrode by using the electrode mixture slurry after the ionization step. In the invention, when the electrode mixture is in the form of a slurry, the metal impurity contained in the electrode mixture is ionized to minimize the amount of the impurity. Therefore, the invention can provide a highly reliable non-aqueous electrolyte secondary battery while minimizing a decrease in production yield by the metal impurity.

6 Claims, 1 Drawing Sheet

NON-AQUEOUS ELECTROLYTE SECONDARY BATTERY AND METHOD FOR PRODUCING THE SAME

RELATED APPLICATIONS

This application is the U.S. National Phase under 35 U.S.C. §371 of International Application No. PCT/JP2008/050876, filed on Jan. 23, 2008, which in turn claims the benefit of Japanese Application No. 2007-013323, filed on Jan. 24, 2007, the disclosures of which Applications are incorporated by reference herein.

TECHNICAL FIELD

The invention relates mainly to a method for producing a non-aqueous electrolyte secondary battery and specifically to a preferable treatment of an electrode mixture used in the production process thereof.

BACKGROUND ART

Non-aqueous electrolyte secondary batteries can include, for example, a positive electrode including a positive electrode active material, a negative electrode including a negative electrode active material, a separator disposed between the positive electrode and the negative electrode, and a non-aqueous electrolyte. The positive electrode active material can be, for example, a lithium-containing composite oxide such as lithium cobaltate. The negative electrode active material can be, for example, a graphite material. The separator has the function of insulating the positive electrode from the negative electrode while retaining the non-aqueous electrolyte. The separator can be, for example, a microporous sheet made of polyethylene resin.

In the production process of such a non-aqueous electrolyte secondary battery, due to the friction between metal components included in machinery used as production equipment, impurities that are in the state of metal may enter, for example, the positive electrode. If such an undesirable impurity enters the positive electrode, which has a high potential, the impurity (metal) is ionized in the positive electrode and dissolved in the non-aqueous electrolyte. The ionized metal deposits on the negative electrode due to charge/discharge of the battery. When the amount of the metal deposited on the negative electrode reaches a predetermined amount or more, it grows into dendritic form. The dendritic metal impurity penetrates through the separator and reaches the positive electrode, thereby causing a short-circuit between the positive electrode and the negative electrode. Such a short-circuit results in a decrease in battery voltage and battery capacity.

It is thus desirable to minimize the amount of impurities contained in battery materials and/or the amount of impurities entering the battery in the production process.

However, the production of impurities due to the friction between metal components cannot be easily suppressed. Thus, detection methods of impurities have been proposed.

For example, Patent Document 1 proposes detecting impurities contained in a positive electrode material slurry by using a magnet. Patent Document 2 proposes detecting whether or not a thin layer of electrode materials for a lithium secondary battery contains impurities that cause magnetic disturbance by using a device that detects magnetic disturbance by magnetic impedance effect.

Patent Document 1: Japanese Laid-Open Patent Publication No. 2002-358952

Patent Document 2: Japanese Laid-Open Patent Publication No. 2005-183142

DISCLOSURE OF THE INVENTION

Problem to be Solved by the Invention

The technique disclosed in Patent Document 1 prepares a slurry of positive electrode materials, takes a part of it for sampling, and detects metal impurities contained therein by using a magnet. That is, Patent Document 1 does not test the whole electrode material slurry prepared. Further, according to the method disclosed in Patent Document 1, it is difficult to detect metal species having low magnetic susceptibility such as stainless steel alloy.

The technique disclosed in Patent Document 2 measures the disturbance of magnetic impedance caused by impurities contained in an electrode. However, the electrode materials contain particles of predetermined distribution. That is, the particle size of the particles contained in the battery materials is not uniform. Also, when the active material is diamagnetic, the impedance becomes a very small value. In such cases, the measurement of electrode magnetic impedance is affected by geomagnetic variation. Further, the disturbance of magnetic field caused by magnetic material present near the measuring device and the power source is undesirably detected. Therefore, the technique disclosed in Patent Document 2 is susceptible to measurement errors.

It is therefore an object of the invention to provide a non-aqueous electrolyte secondary battery in which the influence of impurities on battery performance is reduced, regardless of whether or not the impurities are non-magnetic, or whether or not the measurement of the impurities involves errors. A further object is to minimize a decrease in production yield due to impurities.

Means for Solving the Problem

The method for producing a non-aqueous electrolyte secondary battery according to the invention includes: (a) a step of preparing an electrode mixture slurry; (b) an ionization step of oxidizing and ionizing a metal impurity present in the electrode mixture slurry; and (c) a step of producing an electrode by using the electrode mixture slurry after the ionization step.

In a preferable embodiment of the invention, the ionization step includes a step of chemically oxidizing the metal impurity by an oxidant for ionization. The oxidant preferably includes at least one selected from the group consisting of oxygen gas, ozone gas, inorganic peroxides, and organic peroxides.

In another preferable embodiment of the invention, the ionization step includes a step of passing current through the electrode mixture slurry to electrochemically oxidize the metal impurity for ionization.

The invention also pertains to a non-aqueous electrolyte secondary battery produced by the aforementioned production method.

Effect of the Invention

According to the invention, before an electrode is produced, metal impurities contained in an electrode mixture slurry for a non-aqueous electrolyte secondary battery can be diffused to a level at which they do not affect battery performance. Therefore, the invention can provide a highly reliable non-aqueous electrolyte secondary battery. Further, as described above, since the metal impurities are ionized, a decrease in production yield due to the metal impurities can be minimized.

BEST MODE FOR CARRYING OUT THE INVENTION

Figure 1:
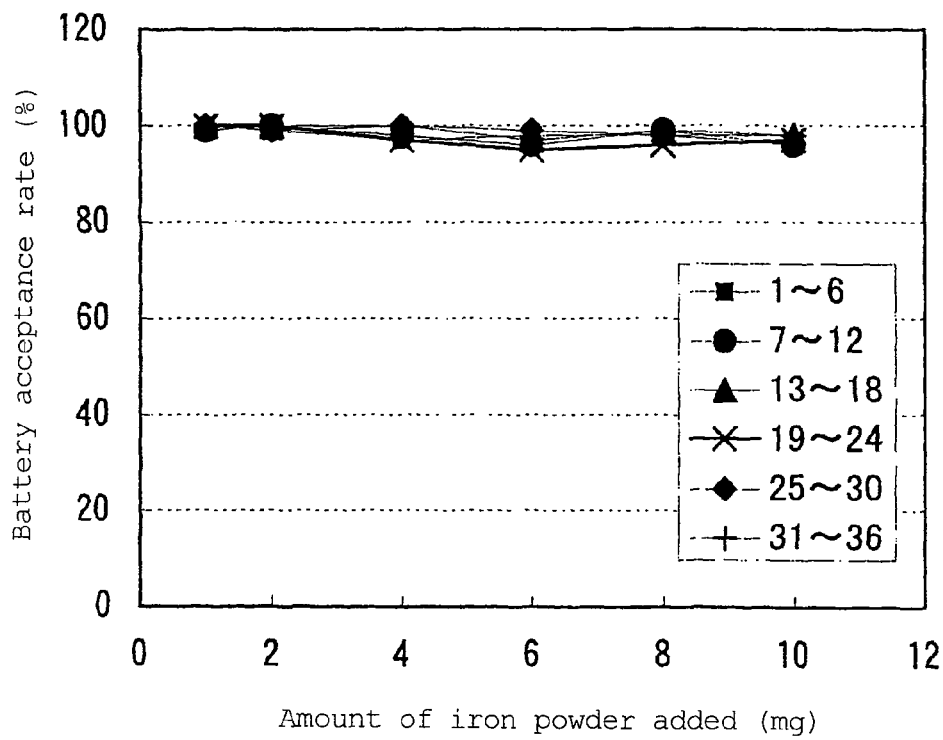
FIG. 1 is a graph showing the relation between the amounts of iron powder added and the acceptance rates of batteries in Examples of the invention.

As described above, if a metal impurity is present in an electrode in the form of a metal species, it is oxidized and dissolved when the potential becomes noble, and moves to a negative electrode due to electrophoresis. In a lithium ion battery, in particular, since the battery voltage is as high as approximately 4 V, the metal impurity is easily oxidized and ionized. The ionized metal impurity deposits mainly on the negative electrode and grows as dendrites before diffusing in the electrolyte. The grown dendrites penetrate through the separator and reach the positive electrode, thereby causing self discharge. As a result, battery voltage and battery capacity decrease.

Therefore, the invention proposes ionizing a metal impurity contained in an electrode mixture slurry and thereafter producing an electrode using the electrode mixture slurry. That is, according to the invention, a metal impurity contained in an electrode, in particular, a positive electrode, of a non-aqueous electrolyte secondary battery is converted from a metal state, in which oxidation number is zero, to an ion, in which oxidation number is 1 or more. This conversion of the metal impurity is carried out when the electrode mixture is in the form of a slurry.

Specifically, the method for producing a non-aqueous electrolyte secondary battery according to the invention includes:

(a) a step of preparing an electrode mixture slurry, (b) an ionization step of oxidizing and ionizing a metal impurity present in the electrode mixture slurry, and (c) a step of producing an electrode by using the electrode mixture slurry after the ionization step.

In the step (a), an electrode mixture slurry is prepared. The electrode mixture slurry can contain, for example, an active material, a binder, and a dispersion medium. The electrode mixture slurry may further contain a conductive agent, if necessary.

Specifically, a positive electrode mixture slurry can contain, for example, a positive electrode active material, a binder, a conductive agent, and a dispersion medium. A negative electrode mixture slurry can contain, for example, a negative electrode active material, a binder, a conductive agent, and a dispersion medium. When the negative electrode active material comprises a carbon material, the negative electrode mixture slurry may contain or may not contain a conductive agent.

The positive electrode active material and the binder and conductive agent contained in the positive electrode are selected, as appropriate, from materials conventionally used in non-aqueous electrolyte secondary batteries. This also applies to the negative electrode active material and the binder and conductive agent contained in the negative electrode.

The dispersion medium used to prepare the slurry is not particularly limited, and can be, for example, water, N-methyl-2-pyrrolidone, etc.

The electrode mixture slurry can be prepared by using a method that is known in the art.

In the step (b), a metal impurity contained in the electrode mixture slurry is ionized by oxidation. By ionizing the metal impurity contained in the electrode mixture slurry, in particular, the positive electrode mixture slurry, the ions derived from the metal impurity dissolve in the slurry. The metal-impurity-derived ions then diffuse through the slurry due to concentration gradient. Upon diffusion of the metal-impurity-derived ions, the ion concentration in the slurry becomes very low. That is, when metal impurity particles are contained, the metal impurity concentration in the slurry becomes locally high. In the invention, by ionizing and diffusing the metal impurity, the concentration of the metal-impurity-derived ions in the slurry can be made almost uniform and very low. Hence, even if a battery including an electrode made with such an electrode mixture slurry is repeatedly charged/discharged, local formation of metal impurity dendrites on the negative electrode can be suppressed. The invention can thus provide a highly reliable non-aqueous electrolyte secondary battery while suppressing a decrease in production yield due to metal impurities.

Further, in the invention, the metal impurity is ionized by oxidation. The oxidation reaction of the metal impurity is not related to magnetism. The invention is thus not affected by such problems as errors occurring upon measuring impurities and presence of non-magnetic impurities, which are associated with the techniques proposed in Patent Documents 1 and 2.

The ionization step (b) may include a step of chemically oxidizing the metal impurity by an oxidant for ionization. Alternatively, the ionization step (b) may include a step of passing current through the electrode mixture slurry to electrochemically oxidize the metal impurity for ionization.

First, a description is given of the ionization step including a step (b-1) of chemically oxidizing the metal impurity by an oxidant for ionization.

In the step (b-1), the oxidant is preferably at least one selected from the group consisting of oxygen gas, ozone gas, inorganic peroxides, and organic peroxides.

When oxygen gas is used as the oxidant, bubbling the oxygen gas in the electrode mixture slurry can efficiently ionize the metal impurity.

Air contains approximately 20% oxygen gas, with the remainder composed mainly of inactive nitrogen gas. Thus, air may also be used as the oxidant. A mixed gas of air and oxygen gas may also be used.

When a mixed gas containing oxygen gas is used, the oxygen gas concentration is preferably equal to or more than 10% by volume.

Ozone gas may also be used as the oxidant since it has a higher oxidizing ability than oxygen gas. Also, a mixed gas of oxygen gas and ozone gas may also be used as the oxidant. Ozone can be produced from oxygen gas by using a method and a device that are known in the art.

The metal-impurity-derived ions can be efficiently diffused by stirring the slurry. Thus, in the case of using a gaseous oxidant such as oxygen gas, ozone gas, or air, it is preferable to stir the electrode mixture slurry while bubbling an oxidant gas in the electrode mixture slurry.

Examples of organic peroxides which may be used include, but are not particularly limited to, tertiary hydroperoxides such as tert-butyl hydroperoxide, tert-hexyl peroxide, and cumene hydroperoxide; and peracetic acid, performic acid, and ketone peroxide. When an organic peroxide is used as the oxidant, the amount of the organic peroxide added to the electrode mixture slurry is approximately 0.1% by weight to 1% by weight.

Since the amount of the organic peroxide added is small, as described above, the organic peroxide can be used safely even when used singly.

Among the organic peroxides, it is preferable to use low molecular-weight peroxides, for example, peracetic acid and tert-butyl hydroperoxide. The decomposition products of such an oxidant easily volatilize in the drying step of the slurry, and thus do not remain in the electrode after decomposition.

Examples of inorganic peroxides which may be used include sodium percarbonate, hydrogen peroxide, and sodium perchlorate. When an inorganic peroxide is used as the oxidant, the amount of the organic peroxide added to the mixture slurry is approximately 0.1% by weight to 1% by weight.

Among them, hydrogen peroxide is particularly preferred. Hydrogen peroxide decomposes into oxygen and water, which is environmentally preferable. It is also inexpensive.

Alternatively, for example, hydrogen peroxide and acetic acid may be used to produce peracetic acid, which is an oxidant, in the slurry.

It should be noted that the above-mentioned oxidants are not oxidants that are so strong as to affect the active material. Hence, the active material contained in the slurry is hardly affected by such an oxidant.

Next, a description is given of the ionization step including a step (b-2) of passing current through the electrode mixture slurry to electrochemically oxidize the metal impurity for ionization.

In the step (b-2), so-called electrolytic oxidation is applied to ionize the metal impurity.

The step (b-2) can be performed, for example, as follows.

Two electrodes, namely, an anode and a cathode, are inserted into the electrode mixture slurry, and a predetermined voltage is applied between these two electrodes to pass current therebetween. At this time, it is preferable to apply a voltage (potential) that is slightly lower than the voltage (potential) at which the dispersion medium contained in the slurry decomposes. If the dispersion medium contained in the slurry decomposes, the solid content of the slurry may change.

Specifically, when water is used as the dispersion medium to prepare the slurry, it is desirable that the voltage applied be 1.5 V or less. When an organic solvent such as N-methylpyrrolidinone (N-methyl-2-pyrrolidone) is used as the dispersion medium, it is desirable that the voltage applied be 3.0 V or less. As described above, the voltage applied to ionize the metal impurity is sufficiently lower than the battery voltage. Thus, the step (b-2) hardly affects the active material.

The step (b-2) intends to ionize the metal impurity by allowing the anode placed into the electrode mixture slurry to contact the metal impurity, thereby causing donation and acceptance of electrons between the anode and the metal impurity. However, ionization of the metal impurity does not necessarily need a contact between the metal impurity and the anode. For example, when the electrode mixture slurry contains a conductive agent, the slurry has a conductive network that is formed of the conductive agent. Through the conductive network, the anode accepts electrons from the metal impurity near the anode so that the metal impurity is ionized.

In the step (b-2), it is also preferable to stir the electrode mixture slurry while passing current therethrough. In this case, the ions derived from the metal impurity near the electrode used for the passage of current can be efficiently diffused.

Next, the electrodes placed into the slurry for the passage of current are described.

The cathode is preferably composed of a material that is stable in the slurry. As such a material, a good conductor can be used without any particular limitation. Examples of such materials which can be used include metal and carbon materials. Further, the metal container for holding the slurry, metal piping or the like may also be used as the cathode.

The anode needs to be an electrode that is highly resistant to oxidation. Desirable electrodes are an electrode comprising platinum and an electrode comprising gold. Alternatively, it is also possible to use, for example, an insoluble electrode composed of titanium metal and sintered platinum or the like provided on the surface of the titanium metal. Such electrodes are inexpensive.

The production method of the invention is particularly effective when the electrode mixture slurry contains metal impurities at 0.1 ppm or more. Generally, the amount of metal impurities contained in an electrode mixture slurry is 1 ppm or less. Hence, by ionizing the aforementioned metal impurity and diffusing it, the concentration of the metal-impurity-derived ions in the slurry can be made almost uniform and markedly low, as described above. Thus, according to the invention, performing the ionization step eliminates the need to perform a troublesome step such as separation of the metal impurity.

In the step (c), using the slurry after the ionization step, an electrode is produced. For example, in the case of a positive electrode, using the positive electrode mixture slurry after the ionization step, a plurality of positive electrode plates are produced.

The electrode can be produced by a method that is known in the art. For example, the slurry after the ionization step is applied onto both sides of a current collector, dried, and rolled to obtain an electrode.

According to the production method of the invention, the metal impurity particles contained in the electrode mixture slurry are ionized. It is thus thought that the electrode mixture slurry does not contain the metal impurity that is in the form of particles detectable, for example, by an X-ray microanalyzer or an electron microscope. That is, it is thought that the electrode produced by the above-described production method does not contain the metal impurity that is in the form of particles detectable by analytical instruments.

In the invention, a non-aqueous electrolyte secondary battery can be obtained, for example, by: (i) a step of producing a positive electrode and a negative electrode, (ii) a step of producing an electrode assembly by using the positive electrode and the negative electrode, and (iii) a step of producing a non-aqueous electrolyte secondary battery by using the electrode assembly.

In the step (i), both of the positive electrode and the negative electrode may be produced by the above-described steps (a) to (c). Alternatively, one of the positive electrode and the negative electrode may be produced by the above-described steps (a) to (c).

The electrode assembly produced by the step (ii) may be of the wound-type or layered type. A wound-type electrode assembly can be obtained, for example, by winding a laminate of the positive electrode, the negative electrode, and a separator interposed therebetween. A layered-type electrode assembly can be obtained by laminating the positive electrode, the negative electrode, and a separator in such a manner that the separator is disposed between the positive electrode and the negative electrode.

In the step (iii), a non-aqueous electrolyte secondary battery can be produced, for example, by placing the electrode assembly obtained by the step (ii) into a battery case, injecting a non-aqueous electrolyte into the battery case, and then sealing the opening of the battery case with a seal plate.

The shape of the non-aqueous electrolyte secondary battery produced is not particularly limited; for example, it may be cylindrical, prismatic, or coin-shaped.

The separator can be a porous sheet made of a material that is known in the art.

The non-aqueous electrolyte can contain, for example, a non-aqueous solvent and a solute dissolved in the non-aqueous solvent. The non-aqueous solvent and solute can be materials that are known in the art.

EXAMPLES

A more detailed description is given using Examples.

Example 1

Preparation of Positive Electrode

A positive electrode mixture slurry was prepared by mixing 1000 g of lithium cobaltate (Cellseed C available from Nippon Chemical Industrial Co., Ltd.), 3 g of carboxymethyl cellulose (available from Daicel Chemical Industries, Ltd.), 4 g of acetylene black (DENKA BLACK available from Denki Kagaku Kogyo K.K.), and 2000 ml of distilled water. To this slurry, 1 mg of iron powder (available from Kanto Chemical Co., Inc.) was added as an impurity. The amount of the metal impurity in this slurry was 0.3 ppm.

Subsequently, the positive electrode mixture slurry containing the impurity was poured into a 3-dm$^3$ stainless steel container. A 6-mm diameter glass tube connected to an oxygen cylinder containing 99.999% oxygen gas (Japan Air Gases Co., 7 m$^3$) via a regulator was inserted into the positive electrode mixture slurry. While the slurry was stirred, the oxygen gas was bubbled for 5 hours. The flow rate of the oxygen gas was set to 2 L/min.

After the bubbling, the slurry was applied onto both sides of a 20 μm aluminum foil, dried, and rolled. The positive electrode plate thus obtained was cut to a predetermined size, to obtain a positive electrode. One end of an aluminum positive electrode lead was attached to the positive electrode.

In this way, using the positive electrode mixture paste, 100 positive electrodes were produced.
(Preparation of Negative Electrode)

A negative electrode mixture paste was prepared by mixing 1000 g of a graphite material (KS-4 available from Timcal Ltd., U.S.), 3 g of polyvinylidene fluoride, and 2000 ml of n-methyl-pyrrolidinone (available from Mitsubishi Chemical Corporation). The resultant paste was applied onto both sides of a 20 μm copper foil, dried, and rolled. The resultant negative electrode plate was cut to a predetermined size, to obtain a negative electrode. One end of a nickel lead was attached to the negative electrode.

In this way, using the negative electrode mixture paste, 100 negative electrodes were produced.
(Fabrication of Battery)

Using the positive electrodes and the negative electrodes thus obtained, 100 cylindrical lithium secondary batteries were produced.

Specifically, they were wound with a 27-μm thick polyethylene separator (E27 available from Tonen Chemical Corporation) interposed therebetween, to obtain an electrode assembly. With an insulator plate provided on top of and under the resultant electrode assembly, the electrode assembly was placed into an iron battery case with a diameter of 18 mm and a height of 650 mm. The other end of the positive electrode lead was connected to a seal plate, while the other end of the negative electrode lead was connected to the inner bottom face of the battery case.

A predetermined amount of a non-aqueous electrolyte (available from Mitsubishi Chemical Corporation) was injected into the battery case containing the electrode assembly to impregnate the electrode assembly with the non-aqueous electrolyte. Subsequently, the opening of the battery case was sealed with the seal plate. In this way, lithium secondary batteries with a design capacity of 2000 mAh were produced.

The non-aqueous electrolyte included a solvent mixture containing ethylene carbonate and diethyl carbonate at 1:1 (volume ratio), and lithium hexafluorophosphate that was dissolved therein at a concentration of 1.0 mol/L.
(Evaluation)

Each of the batteries produced was charged to 4.2 V at a current of 400 mA. The charged battery was then stored at 60° C. for 24 hours, and the voltage of the stored battery was measured. When the open circuit voltage of the battery was less than 4.1 V, the battery was determined to be defective, and when the open circuit voltage was 4.1 V or more, the battery was determined to be acceptable. Table 1 shows the acceptance rate of the batteries produced in this example.

Examples 2 to 6

Batteries 2 to 6 were produced in the same manner as in Example 1 except that the amounts of the iron powder added as the impurity were set to 2 mg (Example 2), 4 mg (Example 3), 6 mg (Example 4), 8 mg (Example 5), and 10 mg (Example 6), respectively. For each of the batteries 2 to 6, 100 batteries were produced.

Using these batteries, acceptance rates were obtained in the same manner as in Example 1. Table 1 shows the results.

The amount of the metal impurity in the slurry of Example 2 was 0.7 ppm, the amount of the metal impurity in the slurry of Example 3 was 1.3 ppm, the amount of the metal impurity in the slurry of Example 4 was 2.0 ppm, the amount of the metal impurity in the slurry of Example 5 was 2.7 ppm, and the amount of the metal impurity in the slurry of Example 6 was 3.3 ppm.

Examples 7 to 12

Batteries 7 to 12 were produced in the same manner as in Examples 1 to 6 except for the use of air as the gas to be bubbled in the positive electrode mixture slurry. For each of the batteries 7 to 12, 100 batteries were produced.

Using these batteries, acceptance rates were obtained in the same manner as in Example 1. Table 1 shows the results.

Examples 13 to 18

Batteries 13 to 18 were produced in the same manner as in Examples 1 to 6 except for the use of a mixed gas of oxygen gas and ozone as the gas to be bubbled in the positive electrode mixture slurry. For each of the batteries 13 to 18, 100 batteries were produced. The mixed gas was prepared by passing the oxygen gas used in Example 1 through an ozone generator of Silver Seiko Ltd. (SP-01A available from Silver Seiko Ltd.).

Using these batteries, acceptance rates were obtained in the same manner as in Example 1. Table 1 shows the results.

Examples 19 to 24

A battery 19 was produced in the same manner as in Example 1 except for the following. With the amount of the iron powder added as the impurity set to 1 mg, a positive electrode mixture slurry was prepared in the same manner as in Example 1. The resultant slurry was poured into a 3 dm$^3$ stainless steel container. With stirring, 10 ml of 35% aqueous solution of hydrogen peroxide (available from Wako Pure Chemical Industries, Ltd.) was added to the slurry and further stirred for 5 hours.

Batteries 20 to 24 were produced in the same manner as the battery 19 except that the amounts of the iron powder added were set to 2 mg, 4 mg, 6 mg, 8 mg, and 10 mg, respectively. For each of the batteries 19 to 24, 100 batteries were produced.

Using these batteries, acceptance rates were obtained in the same manner as in Example 1. Table 1 shows the results.

Examples 25 to 30

A battery 25 was produced in the same manner as in Example 1 except for the following. With the amount of the iron powder added as the impurity set to 1 mg, a positive electrode mixture slurry was prepared in the same manner as in Example 1. The resultant slurry was poured into a 3 dm$^3$ stainless steel container. With stirring, 20 ml of 10% aqueous solution of t-butyl hydroperoxide was added to the slurry and further stirred for 5 hours.

Batteries 26 to 30 were produced in the same manner as in the Example 25 except that the amounts of the iron powder added were set to 2 mg, 4 mg, 6 mg, 8 mg, and 10 mg, respectively. For each of the batteries 25 to 30, 100 batteries were produced.

Using these batteries, acceptance rates were obtained in the same manner as in Example 1. Table 1 shows the results.

Examples 31 to 36

A battery 31 was produced in the same manner as in Example 1 except for the following. With the amount of the iron powder added as the impurity set to 1 mg, a positive electrode mixture slurry was prepared in the same manner as in Example 1. The resultant slurry was poured into a 3 dm$^3$ stainless steel container, and an anode and a cathode were inserted into the slurry. While the slurry was stirred, a voltage of 1.0 V was applied between the two electrodes for 5 hours. Batteries 32 to 36 were produced in the same manner as in Example 31 except that the amounts of the iron powder added were set to 2 mg, 4 mg, 6 mg, 8 mg, and 10 mg, respectively. For each of the batteries 31 to 36, 100 batteries were produced.

Using these batteries, acceptance rates were obtained in the same manner as in Example 1. Table 1 shows the results.

Comparative Examples 1 to 6

Comparative batteries 1 to 6 were produced in the same manner as in Example 1 except that the amounts of the iron added to the positive electrode mixture slurry prepared in Example 1 were set to 1 mg (Comparative Example 1), 2 mg (Comparative Example 2), 4 mg (Comparative Example 3), 6 mg (Comparative Example 4), 8 mg (Comparative Example 5), and 10 mg (Comparative Example 6), respectively, and that nitrogen gas was bubbled instead of the oxygen gas. For each of the comparative batteries 1 to 6, 100 batteries were produced.

Using these batteries, acceptance rates were obtained in the same manner as in Example 1. Table 2 shows the results.

Comparative Examples 7 to 12

Comparative batteries 7 to 12 were produced in the same manner as in Examples 31 to 36 except that no voltage was applied between the anode and the cathode. For each of the comparative batteries 7 to 12, 100 batteries were produced.

Using these batteries, acceptance rates were obtained in the same manner as in Example 1. Table 2 shows the results.

Comparative Examples 13 to 18

Comparative batteries 13 to 18 were produced in the same manner as in Examples 1 to 6 except that the prepared positive electrode mixture slurry was not subjected to the ionization step of the impurity. For each of the comparative batteries 13 to 18, 100 batteries were produced.

Using these batteries, acceptance rates were obtained in the same manner as in Example 1. Table 2 shows the results.

FIG. 1 is a graph showing the relation between the amounts of the iron powder and the acceptance rates of the batteries in Examples 1 to 36. In FIG. 1, Examples 1 to 6 are represented by black squares, Examples 7 to 12 are represented by black circles, Examples 13 to 18 are represented by black triangles, Examples 19 to 24 are represented by Xes, Examples 25 to 30 are represented by black rhombuses, and Examples 31 to 36 are represented by crosses.

Figure 2:
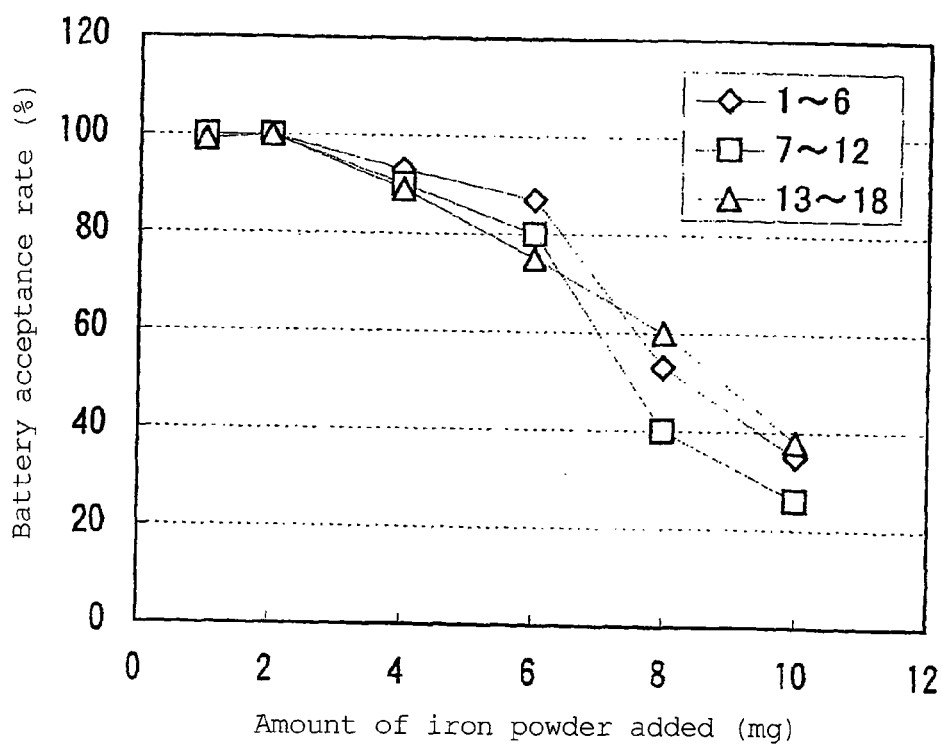
FIG. 2 is a graph showing the relation between the amounts of iron powder added and the acceptance rates of batteries in Comparative Examples.

FIG. 2 is a graph showing the relation between the amounts of the iron powder and the acceptance rates of the batteries in Comparative Examples 1 to 18. In FIG. 2, Comparative Examples 1 to 6 are represented by outlined circles, Comparative Examples 7 to 12 are represented by outlined squares, and Comparative Examples 13 to 18 are represented by outlined triangles.

TABLE 1

|  | Amount of iron powder added (mg) | Acceptance rate (%) |
|---|---|---|
| Example 1 | 1 | 100 |
| Example 2 | 2 | 99 |
| Example 3 | 4 | 97 |
| Example 4 | 6 | 98 |
| Example 5 | 8 | 98 |
| Example 6 | 10 | 96 |
| Example 7 | 1 | 99 |
| Example 8 | 2 | 100 |
| Example 9 | 4 | 98 |
| Example 10 | 6 | 96 |
| Example 11 | 8 | 99 |
| Example 12 | 10 | 96 |
| Example 13 | 1 | 100 |
| Example 14 | 2 | 100 |
| Example 15 | 4 | 100 |
| Example 16 | 6 | 97 |
| Example 17 | 8 | 99 |
| Example 18 | 10 | 98 |
| Example 19 | 1 | 100 |
| Example 20 | 2 | 100 |
| Example 21 | 4 | 97 |
| Example 22 | 6 | 95 |

TABLE 1-continued

|  | Amount of iron powder added (mg) | Acceptance rate (%) |
| --- | --- | --- |
| Example 23 | 8 | 96 |
| Example 24 | 10 | 97 |
| Example 25 | 1 | 100 |
| Example 26 | 2 | 99 |
| Example 27 | 4 | 100 |
| Example 28 | 6 | 99 |
| Example 29 | 8 | 98 |
| Example 30 | 10 | 96 |
| Example 31 | 1 | 100 |
| Example 32 | 2 | 100 |
| Example 33 | 4 | 100 |
| Example 34 | 6 | 99 |
| Example 35 | 8 | 98 |
| Example 36 | 10 | 98 |

TABLE 2

|  | Amount of iron powder added (mg) | Acceptance rate (%) |
| --- | --- | --- |
| Comparative Example 1 | 1 | 100 |
| Comparative Example 2 | 2 | 100 |
| Comparative Example 3 | 4 | 93 |
| Comparative Example 4 | 6 | 87 |
| Comparative Example 5 | 8 | 53 |
| Comparative Example 6 | 10 | 35 |
| Comparative Example 7 | 1 | 100 |
| Comparative Example 8 | 2 | 100 |
| Comparative Example 9 | 4 | 90 |
| Comparative Example 10 | 6 | 80 |
| Comparative Example 11 | 8 | 40 |
| Comparative Example 12 | 10 | 26 |
| Comparative Example 13 | 1 | 99 |
| Comparative Example 14 | 2 | 100 |
| Comparative Example 15 | 4 | 89 |
| Comparative Example 16 | 6 | 75 |
| Comparative Example 17 | 8 | 60 |
| Comparative Example 18 | 10 | 38 |

The results of Table 1 and Table 2 and FIG. 1 and FIG. 2 showed that in the batteries of Examples 1 to 36, even if the amount of the iron powder added as the impurity was increased, almost no drop in battery voltage was found. That is, it was found that as in Examples 1 to 36, by ionizing the metal impurity contained in the positive electrode mixture slurry, a drop in battery voltage could be suppressed. The iron powder added to the positive electrode mixture slurry is oxidized to iron ions due to the oxidation by the oxidant or the electrochemical oxidation. Since the iron ions evenly diffuse through the slurry, local dissolution and deposition of the metal impurity do not occur. This is probably the reason why a drop in battery voltage was suppressed.

On the other hand, in the batteries of Comparative Examples 1 to 18, when the amount of the iron powder added as the impurity was increased, their battery voltages dropped. The reason of such battery voltage drop is probably as follows. When the battery containing the ion powder in the positive electrode is charged/discharged, the iron powder electrochemically dissolves from the positive electrode and deposits on the negative electrode repeatedly. As a result, a short-circuit between the positive electrode and the negative electrode is caused by dendrites of the iron and a self discharge results.

Industrial Applicability

The invention permits the production of a highly reliable non-aqueous electrolyte secondary battery with a high yield.

The invention claimed is:

1. A method for producing a non-aqueous electrolyte secondary battery, comprising:
    a step of preparing an electrode mixture slurry including an active material, a binder and a dispersion medium;
    an ionization step of oxidizing and ionizing a metal impurity present in the electrode mixture slurry; and
    a step of producing an electrode by using the electrode mixture slurry after the ionization step, wherein:
    the ionization step includes a step of passing current through the electrode mixture slurry to electrochemically oxidize the metal impurity for ionization, and
    a voltage of 3.0 V or less is applied to pass the current through the electrode mixture slurry.

2. The method for producing a non-aqueous electrolyte secondary battery in accordance with claim 1, wherein in the ionization step, an anode and a cathode are inserted into the electrode mixture slurry, and a predetermined voltage is applied between the anode and the cathode to pass current therebetween thereby to pass the current through the electrode mixture slurry.

3. The method for producing a non-aqueous electrolyte secondary battery in accordance with claim 1, wherein:
    the electrode mixture slurry includes water as the dispersion medium, and
    a voltage of 1.5 V or less is applied to pass the current through the electrode mixture slurry.

4. The method for producing a non-aqueous electrolyte secondary battery in accordance with claim 1, wherein the electrode mixture slurry includes N-methyl-2-pyrrolidone as the dispersion medium.

5. The method for producing a non-aqueous electrolyte secondary battery in accordance with claim 1, wherein the electrode mixture slurry contains the metal impurities at 0.1 ppm or more.

6. The method for producing a non-aqueous electrolyte secondary battery in accordance with claim 1, wherein the electrode mixture slurry contains the metal impurities at 1.2 to 3 ppm.

* * * * *